United States Patent Office 3,270,542
Patented Sept. 6, 1966

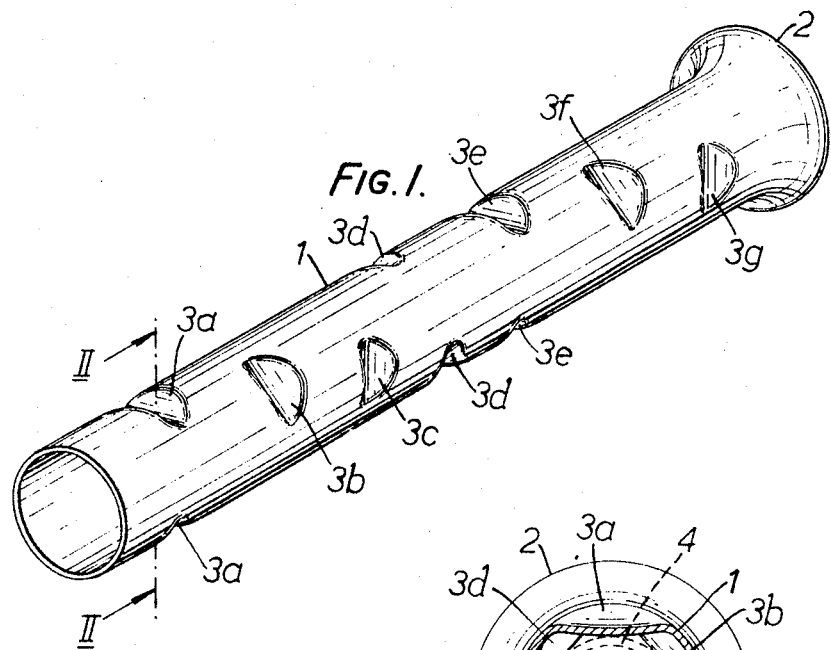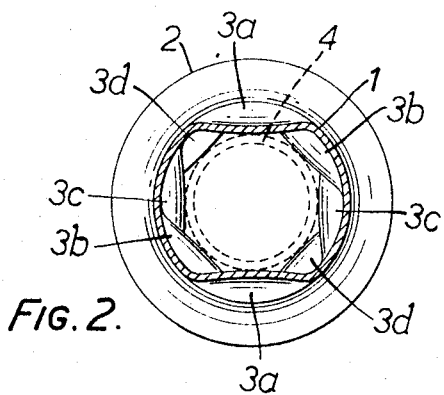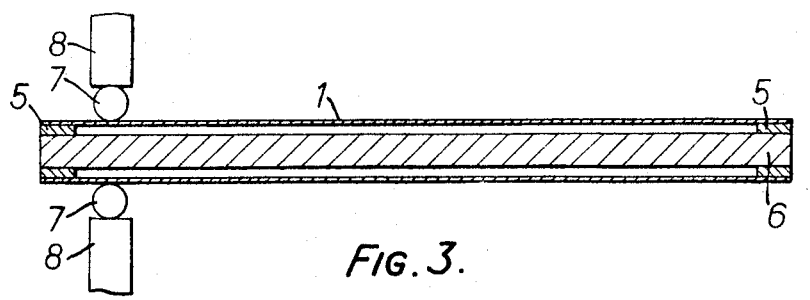

3,270,542
TUBE-STRAIGHTENING TOOLS
William Horace Kennedy, 41 The Drive, Harefield Place, Uxbridge, Middlesex, England
Filed Feb. 28, 1964, Ser. No. 348,058
Claims priority, application Great Britain, Mar. 7, 1963, 9,140/63
5 Claims. (Cl. 72—160)

This invention relates to tube-straightening tools.

According to the present invention a tube-straightening tool comprises a tubular member formed with a plurality of inwardly extending projections the inner surfaces of which are smoothly rounded and define a channel whose diameter substantially corresponds to the outer diameter of the tube which the tool is designed to straighten.

Convenietnly the inwardly extending projections are provided by indented depressions formed in the wall of the tubular member, and may be arranged in diametrically opposed pairs.

In a preferred embodiment the inwardly extending projections are arranged in a helical formation around the inner surface of the tubular member, and one end of the latter is adapted to function as an inlet end for the reception of a tube to be straightened.

The invention will now be described with reference to the accompanying drawings, of which:

FIGURE 1 is a perspective view of a tube straightening tool according to the invention, FIGURE 2 is a transverse sectional elevation of the tool of FIGURE 1 as indicated by the arrows II—II in FIGURE 1; and FIGURE 3 shows in diagrammatic form the method of producing the tool shown in FIGURES 1 and 2.

The embodiment shown in FIGURES 1 and 2 is a tubular member consisting of a steel tube 1 having a flared end 2. The wall of the cylindrical portion of the tubular member is formed with a series of opposed pairs of depressions 3a . . . 3g equally spaced along the length of the tube 1. These depressions are arranged in a helical formation around the surface of the tubular member, each successive pair of depressions being displaced around the circumference of the tubular member by 45° from the immediately preceding pair. The effect of this arrangement is most clearly shown in FIGURE 2 where the inwardly directed convex projections formed by the depressions are seen to define a channel whose diameter substantially corresponds to the outer diameter of the tube to be straightened., and through which the said tube, as indicated in dotted lines at 4, is just able to pass.

The method of construction of the apparatus of FIGURES 1 and 2 is illustrated in FIGURE 3. A cylindrical steel tube 1, of about 1.5 times the diameter of the tubing to be straightened, is fitted with a pair of end plugs 5 which serve as centering members for a cylindrical steel rod 6 whose diameter is the same as the outer diameter of the tubing to be straightened. The assembly of tube and central rod is then passed between a pair of parallel cylindrical rods 7 mounted on the jaws 8 of a suitable hand or machine tool. The jaws are then closed together until the two opposed depressions formed in the tube 1 meet the central rod 6. The jaws 8 are then released, the tube is advanced by the necessary distance, rotated through 45° about its axis and the jaws are again closed until the inward projections produced by two opposed depressions meet the rod 6. This process is continued until the desired number of projections has been formed. The rod 6 and plugs 5 are then removed from the tube 1, and one end of the tube is flared to form the inlet portion 2 illustrated in FIGURES 1 and 2. In order to make the tool easier to use, any convenient grip may be molded around the tube 1, for example using metal or synthetic plastics material. In one embodiment an aluminum spool-shaped body is molded around the tube, the latter forming the hollow core of the spool.

The method of use of the tool of the invention is indicated in FIGURE 2. The end of a tube 4 to be straightened is inserted into the flared end 2 of the tool, which is pushed over the end of the tube 4 until the end of the tube 4 projects from the opposite end of the tool. The projecting end of the tube 4 is then clamped in a vise, and the straightener is drawn along the remainder of the tube 4. The inwardly directed projections within the tool engage and act upon the surface of the tube 4 to straighten the tube 4 as the tool is drawn over it. The drawing of the tool over the tube may be carried out by hand or with the assistance of power driven means. When the inwardly directed projections lie on a helix, the tool may be drawn over the tube by a screw-like rotational movement.

Although not illustrated, it is possible to produce a tool according to the invention in which the channel defined by the inwardly directed projections increases gradually in diameter between the main body of the tool and the flared, or inlet end of the tool. This construction simplifies the threading of the tool onto a tube, since the straightening of the free end of a tube is carried out gradually and does not have to be achieved in one step. To make such a tool, the only modification to the method of FIGURE 3 is the replacement of the cylindrical former 6 by a former similar thereto but having a gradually increasing diameter at one end.

The straightening tool of the present invention is particularly suitable for the straightening of malleable tubing, such as the copper tubing at present used in small-bore domestic installations. Such copper tubing is usually supplied in coils and must be straightened before use. The present invention provides a simple and portable tool suited for on-site straightening of this copper tubing.

I claim:

1. A tube-straightening tool comprising a hollow tubular member having an inner tubular surface, and a plurality of rounded projections on said inner surface, defined by corresponding spaced indentations of the tubular member and extending internally thereof, the crests of the said projections together defining a channel whose transverse width is substantially equal to the outer diameter of the tube to be straightened.

2. A tube-straightening tool comprising a hollow tubular member having an inner tubular surface and a plurality of opposed pairs of rounded projections disposed in helical formation around the said inner surface, the said rounded projections extending internally of the said tubular member and being defined by corresponding indentations thereof, the crests of the said projections together defining a channel whose transverse width is substantially equal to the outer diameter of the tube to be straightened.

3. A tube-straightening tool comprising a hollow tubular member having an inner tubular surface and a first, flared end, and a plurality of pairs of rounded projections arranged helically on said inner tubular surface, said rounded projections being formed by corresponding indentations of the said tubular member and the crests of the said rounded projections together defining a tube-straighten channel whose transverse width for a majority of its length is generally the same as the outer diameter of the tube to be straightened, said transverse width increasing towards the said first end of the tubular member thereby defining an inlet portion of the tool.

4. A tube-straightening tool comprising a hollow tubular member having an inner tubular surface, and a plurality of spaced rounded projections formed on said inner tubular surface, the crests of said projections together defining a channel whose transverse width is substantially equal to the outer diameter of the tube to be straightened.

5. The tube-straightening tool of claim 4 wherein the said rounded projections are arranged in opposed pairs on the said inner tubular surface.

References Cited by the Examiner

UNITED STATES PATENTS

| | | | |
|---|---|---|---|
| 3,029,845 | 4/1962 | Egedal | 140—147 |
| 3,068,931 | 12/1962 | Clever | 72—164 |
| 3,154,115 | 10/1964 | Busl | 140—147 |

CHARLES W. LANHAM, *Primary Examiner.*

L. A. LARSON, *Assistant Examiner.*